(12) United States Patent
Williamson et al.

(10) Patent No.: US 6,274,041 B1
(45) Date of Patent: Aug. 14, 2001

(54) INTEGRATED FILTER COMBINING PHYSICAL ADSORPTION AND ELECTROKINETIC ADSORPTION

(75) Inventors: Bruce S. Williamson; Kevin P. McGrath, both of Alpharetta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 09/461,088

(22) Filed: Dec. 14, 1999

Related U.S. Application Data

(60) Provisional application No. 60/112,796, filed on Dec. 18, 1998.

(51) Int. Cl.[7] ................................................. B01D 36/02
(52) U.S. Cl. ........................ 210/243; 210/266; 210/290; 210/490; 210/492; 210/505
(58) Field of Search ................................. 210/243, 266, 210/282, 290, 489, 490, 492, 502.1, 505, 508, 509, 510.1; 55/315, 318, 321, 323, 332

(56) References Cited

U.S. PATENT DOCUMENTS

| | | |
|---|---|---|
| Re. 34,296 | 6/1993 | Roesink . |
| 2,746,607 | 5/1956 | Hess . |
| 3,585,107 | 6/1971 | Williams . |
| 3,876,738 | 4/1975 | Marinaccio . |
| 3,895,166 | 7/1975 | Wood . |
| 3,961,125 | 6/1976 | Suminokura . |
| 3,979,285 | 9/1976 | Wegmuller . |
| 4,007,113 | 2/1977 | Ostreicher . |
| 4,007,114 | 2/1977 | Ostreicher . |
| 4,162,348 | 7/1979 | Juzu . |
| 4,230,573 | 10/1980 | Kilty . |
| 4,235,764 | 11/1980 | Dereser . |
| 4,238,329 | 12/1980 | Zievers . |

(List continued on next page.)

FOREIGN PATENT DOCUMENTS

| | | |
|---|---|---|
| 19540876 | 5/1997 | (DE) . |
| 0005536 | 11/1979 | (EP) . |
| 0058978 | 9/1982 | (EP) . |
| 0069435 | 1/1983 | (EP) . |
| 0077633 | 4/1983 | (EP) . |
| 0252477 | 1/1988 | (EP) . |
| 0347755 | 12/1989 | (EP) . |
| 0496218 | 7/1992 | (EP) . |
| 0606646 | 7/1994 | (EP) . |
| 0792677 | 9/1997 | (EP) . |

(List continued on next page.)

OTHER PUBLICATIONS

Textbook of Polymer Science / Fred W. Billmeyer, Jr., undated.

*Primary Examiner*—Joseph W. Drodge
(74) *Attorney, Agent, or Firm*—Nelson Mullins Riley & Scarborough, L.L.P.

(57) ABSTRACT

An integrated filter for removing impurities from a fluid stream. The filter includes a first element adapted to remove at least some of the impurities by physical adsorption, and a second element adapted to remove at least some of the impurities by electrokinetic adsorption. Either or both of the first element and the second element further may be adapted to remove at least some of the impurities by sieving. The first element generally may be composed of loose particles or granules, or the first element may be composed of a porous block of an adsorbent, wherein the block is permeable to fluids and has interconnected pores therethrough. The second element generally is composed of a porous, charge-modified fibrous web which includes fibers prepared from a thermoplastic polymer. For example, the thermoplastic polymer may be a polyolefin. As another example, the porous, charge-modified fibrous web may be a nonwoven web, such as a meltblown or microfiber glass web. Alternatively, both the first and second elements may be in the form of a sheet.

25 Claims, 4 Drawing Sheets

U.S. PATENT DOCUMENTS

| | | |
|---|---|---|
| 4,241,136 | 12/1980 | Dereser . |
| 4,273,892 | 6/1981 | Rave . |
| 4,282,261 | 8/1981 | Greene . |
| 4,288,462 | 9/1981 | Hou . |
| 4,305,782 | 12/1981 | Ostreicher . |
| 4,309,247 | 1/1982 | Hou . |
| 4,321,288 | 3/1982 | Ostreicher . |
| 4,337,154 | 6/1982 | Fukuchi . |
| 4,340,479 | 7/1982 | Pall . |
| 4,340,480 | 7/1982 | Pall . |
| 4,361,619 | 11/1982 | Forsten . |
| 4,366,068 | 12/1982 | Ostreicher . |
| 4,399,245 | 8/1983 | Kleber . |
| 4,415,664 | 11/1983 | Barszcz . |
| 4,431,542 | 2/1984 | Dingfors . |
| 4,431,545 | 2/1984 | Pall . |
| 4,445,195 | 4/1984 | Yamamoto . |
| 4,473,474 | 9/1984 | Ostreicher . |
| 4,473,475 | 9/1984 | Barnes, Jr. . |
| 4,473,476 | 9/1984 | McMillan . |
| 4,477,634 | 10/1984 | Linder . |
| 4,523,995 | 6/1985 | Pall . |
| 4,555,313 | 11/1985 | Duchane . |
| 4,594,158 | 6/1986 | Chong . |
| 4,604,205 | 8/1986 | Ayers . |
| 4,604,208 | 8/1986 | Chu . |
| 4,606,824 | 8/1986 | Chu . |
| 4,608,173 | 8/1986 | Watanabe . |
| 4,612,251 | 9/1986 | Fredenucci . |
| 4,617,124 | 10/1986 | Pall . |
| 4,617,128 | 10/1986 | Ostreicher . |
| 4,639,513 | 1/1987 | Hou . |
| 4,645,567 | 2/1987 | Hou . |
| 4,659,475 | 4/1987 | Liao . |
| 4,663,163 | 5/1987 | Hou . |
| 4,673,504 | 6/1987 | Ostreicher . |
| 4,676,904 | 6/1987 | Schroder . |
| 4,701,267 | 10/1987 | Watanabe . |
| 4,702,840 | 10/1987 | Degen . |
| 4,702,947 | 10/1987 | Pall . |
| 4,707,266 | 11/1987 | Degen . |
| 4,708,803 | 11/1987 | Ostreicher . |
| 4,711,793 | 12/1987 | Ostreicher . |
| 4,724,082 | 2/1988 | Boom . |
| 4,731,260 | 3/1988 | Balding . |
| 4,734,208 | 3/1988 | Pall . |
| 4,737,291 | 4/1988 | Barnes, Jr. . |
| 4,743,418 | 5/1988 | Barnes, Jr. . |
| 4,747,956 | 5/1988 | Kiniwa . |
| 4,753,728 * | 6/1988 | Vanderbilt et al. .................. 210/282 |
| 4,765,915 | 8/1988 | Diehl . |
| 4,765,923 | 8/1988 | Walterick, Jr. . |
| 4,780,369 | 10/1988 | Schnabel . |
| 4,798,615 | 1/1989 | Fukuta . |
| 4,803,171 | 2/1989 | Baier . |
| 4,810,567 | 3/1989 | Calcaterra . |
| 4,810,576 | 3/1989 | Gaa . |
| 4,833,011 | 5/1989 | Horimoto . |
| 4,853,431 | 8/1989 | Miller . |
| 4,859,340 | 8/1989 | Hou . |
| 4,876,036 | 10/1989 | Candau . |
| 4,888,115 | 12/1989 | Marinaccio . |
| 4,895,685 | 1/1990 | Honda . |
| 4,908,137 | 3/1990 | Chen . |
| 4,915,839 | 4/1990 | Marinaccio . |
| 4,925,572 | 5/1990 | Pall . |
| 4,936,998 | 6/1990 | Nishimura . |
| 4,944,879 | 7/1990 | Steuck . |
| 4,946,603 | 8/1990 | Laugharn . |
| 4,950,549 | 8/1990 | Rolando . |
| 4,981,591 | 1/1991 | Ostreicher . |
| 5,004,543 | 4/1991 | Pluskal . |
| 5,039,787 | 8/1991 | Tanaka . |
| 5,049,275 | 9/1991 | Gillberg-LaForce . |
| 5,049,282 | 9/1991 | Linder . |
| 5,059,654 | 10/1991 | Hou . |
| 5,085,780 | 2/1992 | Ostreicher . |
| 5,085,784 | 2/1992 | Ostreicher . |
| 5,089,134 | 2/1992 | Ando . |
| 5,091,102 | 2/1992 | Sheridan . |
| 5,094,749 | 3/1992 | Seita . |
| 5,106,501 | 4/1992 | Yang . |
| 5,114,585 | 5/1992 | Kraus . |
| 5,128,041 | 7/1992 | Degen . |
| 5,133,878 | 7/1992 | Gsell . |
| 5,137,633 | 8/1992 | Wang . |
| 5,151,189 | 9/1992 | Hu . |
| 5,160,627 | 11/1992 | Cussler . |
| 5,178,766 | 1/1993 | Ikeda . |
| 5,186,835 | 2/1993 | Masuoka . |
| 5,202,025 | 4/1993 | Onishi . |
| 5,209,849 | 5/1993 | Hu . |
| 5,227,481 | 7/1993 | Tsai . |
| 5,234,991 | 8/1993 | Tayot . |
| 5,269,921 * | 12/1993 | Ruger et al. ...................... 210/497.1 |
| 5,269,931 | 12/1993 | Hu . |
| 5,277,812 | 1/1994 | Hu . |
| 5,288,403 | 2/1994 | Ohno . |
| 5,292,439 | 3/1994 | Morita . |
| 5,298,165 | 3/1994 | Oka . |
| 5,344,560 | 9/1994 | Sugo . |
| 5,344,620 | 9/1994 | Reiners . |
| 5,346,725 | 9/1994 | Targosz . |
| 5,350,443 | 9/1994 | Von Blucher . |
| 5,350,523 | 9/1994 | Tomoi . |
| 5,393,379 | 2/1995 | Parrinello . |
| 5,407,581 | 4/1995 | Onodera . |
| 5,425,877 | 6/1995 | Knappe . |
| 5,436,068 | 7/1995 | Kobayashi . |
| 5,438,127 | 8/1995 | Woodard . |
| 5,439,564 | 8/1995 | Shimizu . |
| 5,456,843 | 10/1995 | Koenhen . |
| 5,460,945 | 10/1995 | Springer . |
| 5,472,600 | 12/1995 | Ellefson . |
| 5,494,744 | 2/1996 | Everhart . |
| 5,503,745 | 4/1996 | Ogata . |
| 5,510,004 | 4/1996 | Allen . |
| 5,531,893 | 7/1996 | Hu . |
| 5,543,054 | 8/1996 | Charkoudian . |
| 5,547,576 | 8/1996 | Onishi . |
| 5,571,657 | 11/1996 | Szmanda . |
| 5,575,892 | 11/1996 | Devore . |
| 5,578,243 | 11/1996 | Mazaki . |
| 5,618,622 | 4/1997 | Gillberg-Laforce . |
| 5,643,375 | 7/1997 | Wilfong . |
| 5,647,985 | 7/1997 | Ung-Chhun . |
| 5,650,479 | 7/1997 | Glugla . |
| 5,652,050 | 7/1997 | Pall . |
| 5,665,235 | 9/1997 | Gildersleeve . |
| 5,679,248 | 10/1997 | Blaney . |
| 5,688,588 | 11/1997 | Cotton . |
| 5,709,798 | 1/1998 | Adiletta . |
| 5,711,878 | 1/1998 | Ogata . |
| 5,714,073 | 2/1998 | Pall . |
| 5,721,031 | 2/1998 | Echigo . |
| 5,736,051 | 4/1998 | Degen . |
| 5,738,788 | 4/1998 | Tokiwa . |
| 5,743,940 | 4/1998 | Sugo . |
| 5,762,797 | 6/1998 | Patrick . |

| | | | | | | |
|---|---|---|---|---|---|---|
| 5,776,353 | 7/1998 | Palm . | | 1-004212 | 2/1989 | (JP) . |
| 5,783,094 | 7/1998 | Kraus . | | 63-310602 | 2/1989 | (JP) . |
| 5,785,844 | 7/1998 | Lund . | | 1-070108 | 4/1989 | (JP) . |
| 5,795,483 | 8/1998 | Ung-Chhun . | | 1-199614 | 6/1989 | (JP) . |
| 5,830,367 | 11/1998 | Gadsby . | | 1-201582 | 9/1989 | (JP) . |
| 5,846,438 | 12/1998 | Pall . | | 1-1224004 | 10/1989 | (JP) . |
| 5,855,788 | 1/1999 | Everhart . | | 1-224009 | 10/1989 | (JP) . |
| 5,858,503 | 1/1999 | Everhart . | | 2-187136 | 9/1990 | (JP) . |
| 5,863,654 | 1/1999 | Frey . | | 2-212527 | 10/1990 | (JP) . |
| 5,869,152 | 2/1999 | Colon . | | 3-293008 | 2/1992 | (JP) . |
| 5,882,517 | 3/1999 | Chen . | | 4-029729 | 3/1992 | (JP) . |
| 5,895,575 | 4/1999 | Kraus . | | 4-029730 | 3/1992 | (JP) . |
| 5,954,962 | 9/1999 | Adiletta . | | 4-035728 | 3/1992 | (JP) . |
| 5,958,989 | 9/1999 | Wang . | | 4-284853 | 11/1992 | (JP) . |
| 5,979,670 | 11/1999 | Ditter . | | 9-235399 | 11/1997 | (JP) . |
| 5,980,709 | 11/1999 | Hodges . | | 10-279713 | 1/1999 | (JP) . |
| 6,045,694 | 4/2000 | Wang . | | 11-279945 | 3/2000 | (JP) . |
| 6,139,739 | * 10/2000 | Hamlin et al. ................... 210/502.1 | | WO 90/11814 | 10/1990 | (WO) . |
| | | | | WO 93/22039 | 11/1993 | (WO) . |

FOREIGN PATENT DOCUMENTS

| | | |
|---|---|---|
| 0811412 | 12/1997 | (EP) . |
| 2043734 | 10/1980 | (GB) . |
| 2056485 | 3/1981 | (GB) . |
| 60-058221 | 4/1985 | (JP) . |
| 62-007401 | 2/1987 | (JP) . |
| 62-083006 | 5/1987 | (JP) . |
| 62-289203 | 2/1988 | (JP) . |
| 63-031501 | 4/1988 | (JP) . |
| 63-049228 | 4/1988 | (JP) . |

| | | |
|---|---|---|
| WO 96/32178 | 10/1996 | (WO) . |
| WO 97/16233 | 5/1997 | (WO) . |
| WO 97/28882 | 8/1997 | (WO) . |
| WO 97/41960 | 11/1997 | (WO) . |
| WO 98/01208 | 1/1998 | (WO) . |
| WO 98/04335 | 2/1998 | (WO) . |
| WO 98/32705 | 7/1998 | (WO) . |
| WO 00/09797 | 8/1999 | (WO) . |
| ZA 97/5944 | 4/1998 | (ZA) . |

* cited by examiner

INTEGRATED FILTER COMBINING PHYSICAL ADSORPTION AND ELECTROKINETIC ADSORPTION

The present invention is based on provisional patent application Ser. No. 60/112,796 filed Dec. 18, 1998, and priority is hereby claimed therefrom.

FIELD OF THE INVENTION

The present invention relates to filters. More particularly, the present invention relates to filters which are intended to remove contaminants from a fluid stream.

BACKGROUND OF THE INVENTION

In general, filtration involves the removal of suspended solids and/or dissolved impurities from a fluid by passing the fluid through a porous medium. For many applications, the porous medium traditionally has been a bed of particulate matter, such as activated carbon and diatomaceous earth, or a solid porous filter element composed primarily of activated carbon. Solid porous filter elements are especially desirable for ease of handling and ready disposability. They may be made by a batch process, although it is both time consuming and labor intensive. More recently, they may be formed continuously by extruding a mixture of a thermoplastic binder material and a powdered or granular primary material such as activated carbon.

Apertured films, woven fabrics, and nonwoven materials also have been used as filter materials for removing or separating particles from liquids. Generally speaking, such filter materials rely on some form of mechanical straining or physical entrapment. Such filter sheets can pose limitations when the size of the particle to be removed is small relative to the average pore diameter of the filter sheet. For nonwoven materials, this is particularly true for particles of less than one micrometer in diameter.

Improved filters have been developed with modified surface charge characteristics to capture and adsorb particles by electrokinetic interaction between the filter surface and particles contained in an aqueous liquid. Such charge-modified filters typically consist of microporous membranes or involve the use of materials which are blends of glass fibers and cellulose fibers or blends of cellulose fibers and siliceous particles. Such filters may also utilize packed beds of particles. Charge modification generally is accomplished by coating the membrane or at least some of the fibers with a charge-modifying agent and then treating with a separate crosslinking agent in order to ensure the durability of the coating.

While microporous membranes generally are capable of effective filtration, flow rates through the membranes typically are lower than for fibrous filters. Moreover, microporous membranes generally have higher back pressures during the filtration process than do fibrous filters.

With the exception of reverse osmosis and, to a limited extent, hollow fiber membranes, no current filtration technology can effectively remove harmful bacteria and viruses from water. Usually, chemical and ultraviolet disinfection are the only reliable methods for eliminating biological contamination.

Typical activated carbon filter elements, such as those described earlier, are very efficient at removing most aesthetic contaminants from water, e.g., sediment, residual chlorine, and other contaminants which affect taste and odor. Such filter elements also are capable of removing certain health-threatening substances, such as lead and volatile organic compounds. Moreover, recent improvements in the manufacture of block activated carbon elements now permit the efficient removal of certain biological contaminants of larger sizes, such as Cryptosporidium and Giardia. However, in almost all cases the smaller bacteria can readily pass through these filter elements, and those which are trapped then are able to reproduce within the filter element. The continuous or frequent filtration of biologically contaminated water can cause the bacterial levels within the filter to reach several orders of magnitude higher than the levels in the water being filtered. Unless care is taken, this bacterial overgrowth can be flushed directly into the water to be consumed.

Accordingly, there is a need for a filter which has the ability to remove all or significantly reduce contaminants from water, including sediment, organic compounds, odors, chlorine, lead, and bacterial and viral pathogens.

SUMMARY OF THE INVENTION

The present invention addresses some of the difficulties and problems discussed above by providing an integrated filter for removing impurities from a fluid stream. The filter includes a first element adapted to remove at least some of the impurities by physical adsorption, and a second element adapted to remove at least some of the impurities by electrokinetic adsorption. Either or both of the first element and the second element further may be adapted to remove at least some of the impurities by sieving.

The first element generally may be composed of loose particles or granules of an adsorbent, or the first element may be composed of a porous adsorbent block, wherein the block is permeable to fluids and has interconnected pores therethrough. For example, the first element may be composed of a granular adsorbent component and a thermoplastic binder component. By way of illustration only, the adsorbent may be activated carbon, activated alumina, activated bauxite, fuller's earth, diatomaceous earth, silica gel, or calcium sulfate. However, other adsorbents known to those having ordinary skill in the art may be employed.

In some embodiments, the first element may be composed of a coextruded block composite which includes a porous first block and a second block. The porous first block is permeable to fluids, is composed of a granular adsorbent component and a thermoplastic binder component, and has interconnected pores therethrough having a first average diameter. In general, at least one of the first block and the second block is continuous, and at least a portion of the second block is contiguous with at least a portion of the first block.

The second element generally is composed of a porous, charge-modified fibrous web or packed beds which include fiber particles prepared from a thermoplastic polymer. For example, the thermoplastic polymer may be a polyolefin. As another example, the porous, charge-modified fibrous web may be a nonwoven web, such as a meltblown web. In addition, a felted mat of microfiber glass may be employed.

The present invention also provides an integrated filter as described above in which the first element is composed of a porous block of an adsorbent, wherein the block is permeable to fluids and has interconnected pores therethrough, and the second element is composed of a porous, charge-modified fibrous web or packed bed as defined above. Again, either or both of the first element and the second element further may be adapted to remove at least some of the impurities by sieving.

The present invention further provides an integrated filter for removing impurities from a fluid stream. In this case, the filter includes a first element adapted to remove at least some of the impurities by electrokinetic adsorption, a second element adjacent to and contiguous with the first element and adapted to remove at least some of the impurities by physical adsorption, and a third element adjacent to and contiguous with the second element and adapted to remove at least some of the impurities by electrokinetic adsorption. By way of example, each element may be in the form of a sheet.

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

DETAILED DESCRIPTION OF THE REPRESENTATIVE EMBODIMENTS

Figure 1:
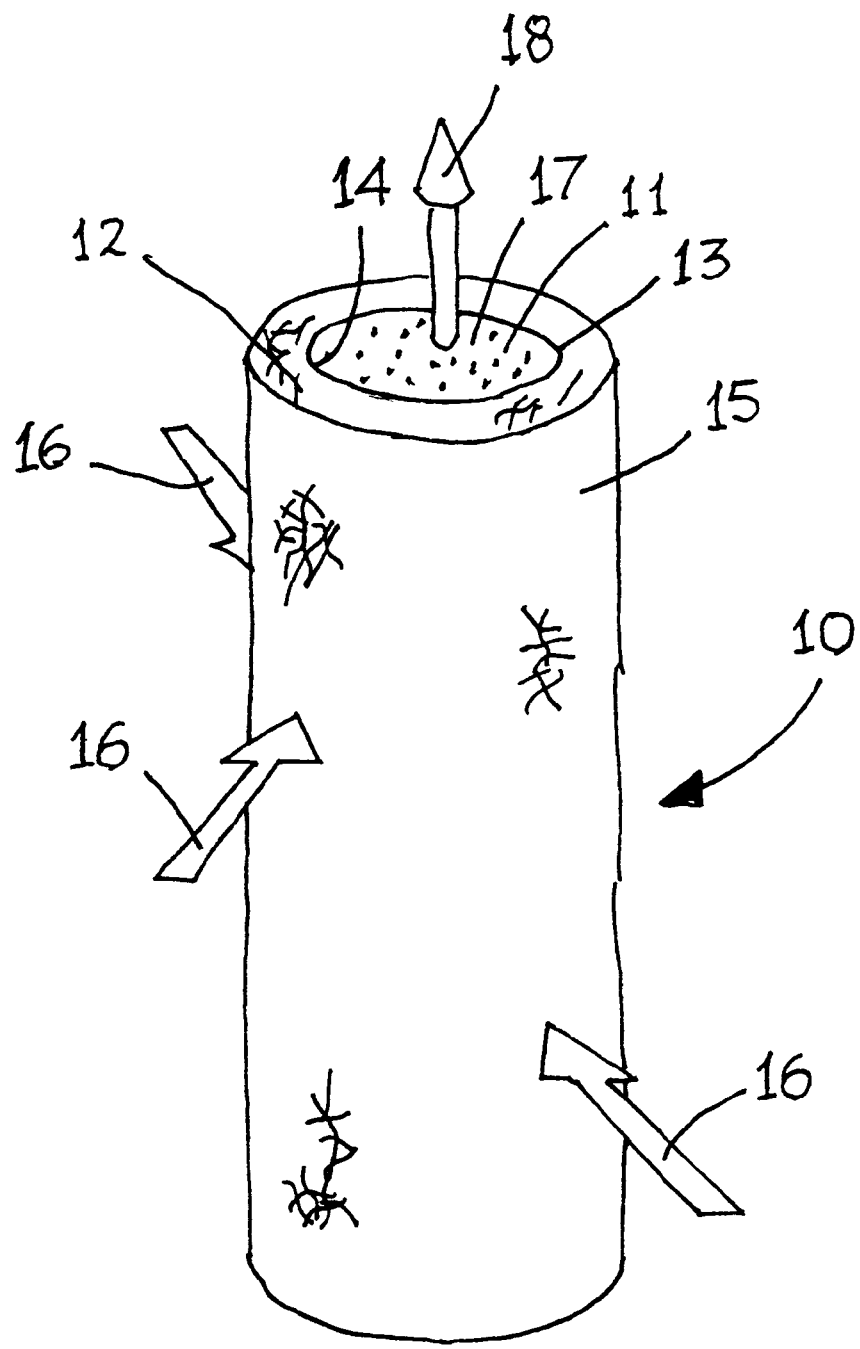
FIG. 1 is a diagrammatic representation of an embodiment of the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Definitions

The term "integrated filter" is used herein to mean a filter composed of at least two elements which are adapted to function in different ways.

As used herein, the term "adsorption" refers to the accumulation or increased concentration of one or more impurities at the surfaces of a filter material, such as the particles of an adsorbent or the fibers of a fibrous web. On the basis of the primary process involved, adsorption may be classified as physical adsorption or electrokinetic adsorption. The term "physical adsorption" refers to adsorption resulting from the physical attraction of one or more impurities to the surfaces of the filter material, chiefly involving van der Waal's forces. The term "electrokinetic adsorption" applies when the impurities adsorbed are charged and the surfaces of the filter material also are charged, but have a polarity opposite that of the impurities.

As used herein, the term "sieving" refers to the removal of particles from a fluid stream by a filter material having pores which are smaller than the sizes of such particles. The ability of any given filter material to sieve particles is independent of the process by which the material may adsorb impurities and is a function of the relative sizes of the particles and the pores of the filter material.

The term "adsorbent" is used herein to encompass any material which is capable of adsorbing impurities primarily by physical adsorption. Examples of adsorbents include, by way of illustration only, activated carbon, activated alumina, activated bauxite, fuller's earth, diatomaceous earth, silica gel, and calcium sulfate. However, other adsorbents known to those having ordinary skill in the art may be employed and are included by the term "adsorbent."

The term "porous block" is used herein to mean a block which is porous and permeable to a fluid. The term "granular" is to be broadly construed as encompassing any particulate material, regardless of particle sizes, which may be suitable for use in the present invention. Thus, the term is intended to include powders.

The term "interconnected pores therethrough" in reference to a block is used herein to mean that essentially all of the pores present in the block are connected to adjacent pores, thereby resulting in a plurality of more or less tortuous pathways from one surface or location to another surface or location. Because the pores are interconnected, a fluid may pass completely through a block. That is, the fluid may enter a block at one location and pass through the block to exit at another location. Thus, the block is "permeable" to a fluid.

As used herein, the term "fluid" is meant to include both gases and liquids.

The term "fibrous web" is used herein to mean any structure composed of fibers, either wholly or in part. Such fibers may be continuous or discontinuous.

As used herein, the term "nonwoven web" means a web or fabric having a structure of individual fibers or threads which are interlaid, but not in an identifiable manner as in a knitted or woven fabric. Nonwoven webs generally may be prepared by methods which are well known to those having ordinary skill in the art. Examples of such processes include, by way of illustration only, meltblowing, coforming, spunbonding, carding and bonding, air laying, and wet laying. Meltblowing, coforming, and spunbonding processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermoplastic Fibers", *Industrial and Engineering Chemistry,* Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry,* Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

As used herein, the term "thermoplastic binder" means any binder, typically a polymer, which is thermoplastic, i.e., capable of softening and flowing when heated and of hardening again when cooled. Examples of thermoplastic binders include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-2-xylylene, and poly(chloro-1-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenyl-eneisopropylidene-1,4-phenylene), and poly(sulfonyl-1,4-phenylene-oxy-1,4-phenylenesulfonyl4,4'-biphenylene); polycarbonates, such as poly-(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexyl-ene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; and copolymers of the foregoing, such as acrylonitrilebutadiene-styrene (ABS) copolymers.

Similarly, the term "thermoplastic polymer" polymer means any polymer which is thermoplastic. Examples of thermoplastic polymers include, by way of illustration only, end-capped polyacetals, such as poly(oxymethylene) or polyformaldehyde, poly(tri-chloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylenechlorotrifluoro-ethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenyleneisopropylidene-1,4-phenylene) and poly(sulfonyl-1,4-phenyleneoxy-1,4-phenylenesulfonyl-4,4'-biphenylene); polycarbonates, such as poly(bisphenol A) or poly(carbonyl-dioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; copolymers of the foregoing, such as acrylonitrilebutadiene-styrene (ABS) copolymers; and the like.

In general, the term "thermoplastic polyolefin" is used herein to mean any thermoplastic polyolefin which may be melt-extruded. Examples of thermoplastic polyolefins include polyethylene, linear low density polyethylene, polypropylene, poly(1-butene), poly(2-butene), poly(1-pentene), poly(2-pentene), poly(3-methyl-1-pentene), poly(4-methyl-1-pentene), and the like. In addition, such term is meant to include blends of two or more polyolefins and random and block copolymers prepared from two or more different unsaturated monomers. Because of their commercial importance, the most desired polyolefins are polyethylene and polypropylene.

As used herein, the term "coextruded block composite" refers to the composite structures described in U.S. Pat. No. 5,679,248 to Blaney, which patent is incorporated herein by reference in its entirety.

The term "sheet" is used herein to mean a three-dimensional structure having a length and a width which are significantly greater than its thickness. More particularly, at least one of the length and width is at least five times the thickness of the structure. In some embodiments, each of the length and width is at least five times the thickness of the structure. For example, each of the length and width may be at least ten times the thickness of the structure.

The Invention

As stated earlier, the present invention provides an integrated filter for removing impurities from a fluid stream. The filter includes a first element adapted to remove at least some of the impurities by physical adsorption, and a second element adapted to remove at least some of the impurities by electrokinetic adsorption. Either or both of the first element and the second element further may be adapted to remove at least some of the impurities by sieving.

The First Element

The first element generally may be composed of loose particles or granules of an adsorbent. Alternatively, the first element may be composed of a porous block of an adsorbent, wherein the block is permeable to fluids and has interconnected pores therethrough. For example, the first element may be composed of a granular adsorbent component and a thermoplastic binder component. By way of illustration only, the adsorbent may be activated carbon, activated alumina, activated bauxite, fuller's earth, diatomaceous earth, silica gel, or calcium sulfate. Desirably, the adsorbent will be activated carbon. However, other adsorbents known to those having ordinary skill in the art may be employed. Moreover, combinations of two or more adsorbents also may be used.

In certain embodiments, the first element may be composed of a coextruded block composite as described in U.S. Pat. No. 5,679,248, supra, which composite includes a porous first block and a second block. The porous first block is permeable to fluids, is composed of a granular adsorbent component and a thermoplastic binder component, and has interconnected pores therethrough having a first average diameter. In general, at least one of the first block and the second block is continuous, and at least a portion of the second block is contiguous with at least a portion of the first block.

In some embodiments, the second block is permeable to fluids, includes a granular component and a thermoplastic binder component, and has interconnected pores therethrough having a second average diameter; that is, the second block also is porous. The second average diameter may be the same as or different from the first average diameter. The granular component of the second block may be selected from the group consisting of activated alumina, activated bauxite, fuller's earth, diatomaceous earth, silica gel, calcium sulfate, ceramic particles, zeolite particles, inert particles, sand, surface charge-modified particles, and mixtures thereof. Alternatively, the second block may include a granular adsorbent which may be the same as or different from the granular adsorbent present in the first block. The second block may be continuous or discontinuous.

The coextruded block composite may include a third block which is permeable to fluids, includes a granular component and a thermoplastic binder component, and has interconnected pores therethrough having a third average diameter. At least a portion of the third block is contiguous with at least a portion of the first block or the second block. In some embodiments, the first, second, and third average diameters are adapted to give the coextruded block composite a gradient pore structure. The granular component of the third block may be as defined immediately above.

Additionally, the coextruded block composite may include a fourth block which is permeable to fluids, includes a granular component and a thermoplastic binder component, and has interconnected pores therethrough having a fourth average diameter. At least a portion of the fourth block is contiguous with at least a portion of the first block, the second block, or the third block. The first, second, third, and fourth average diameters may be adapted to give the coextruded block a gradient pore structure. The granular component may be as defined above.

If desired, the second block may be impermeable to fluids and also may be either continuous or discontinuous. Furthermore, the second block may be adapted to direct a fluid through the first block from a first portion thereof to a second portion thereof along a predetermined pathway. By way of example, the second block may be a thermoplastic polyolefin block, such as a polypropylene block.

The Second Element

The second element generally is composed of a porous, charge-modified fibrous web which includes fibers prepared from a thermoplastic polymer. The second element may also be composed of a packed bed of charge-modified particles, such as diatomaceous earth coated particles. For example, the thermoplastic polymer may be a polyolefin. As another example, the porous, charge-modified fibrous web may be a nonwoven web, such as a meltblown web. In general, the second element may include any of the charge-modified webs known in the art. Desirably, the second element will include one or more of the embodiments described below.

First Embodiment

By way of example, the second element may include a fibrous filter which includes glass fibers having a cationically charged coating thereon. The coating includes a functionalized cationic polymer which has been crosslinked by heat; in other words, the functionalized cationic polymer has been crosslinked by heat after being coated onto the glass fibers. Such fibrous filter is prepared by a method which involves providing a fibrous filter which includes glass fibers, passing a solution of a functionalized cationic polymer crosslinkable by heat through the fibrous filter under conditions sufficient to substantially coat the fibers with the functionalized cationic polymer, and treating the resulting coated fibrous filter with heat at a temperature and for a time sufficient to crosslink the functionalized cationic polymer present on the glass fibers. The functionalized cationic polymer may be an epichlorohydrin-functionalized polyamine or an epichlorohydrin-functionalized polyamidoamine.

In general, the fibrous filter will contain at least about 50 percent by weight of glass fibers, based on the weight of all fibers present in the filter. In some embodiments, essentially 100 percent of the fibers will be glass fibers. When other fibers are present, however, they generally will be cellulosic fibers, fibers prepared from synthetic thermoplastic polymers, or mixtures thereof.

As used herein, the terms "cationically charged" in reference to a coating on a glass fiber and "cationic" in reference to the functionalized polymer mean the presence in the respective coating and polymer of a plurality of positively charged groups. Thus, the terms "cationically charged" and "positively charged" are synonymous. Such positively charged groups typically will include a plurality of quaternary ammonium groups, but they are not necessarily limited thereto.

The term "functionalized" is used herein to mean the presence in the cationic polymer of a plurality of functional groups, other than the cationic groups, which are capable of crosslinking when subjected to heat. Thus, the functional groups are thermally crosslinkable groups. Examples of such functional groups include epoxy, ethylenimino, and episulfido. These functional groups readily react with other groups typically present in the cationic polymer. The other groups typically have at least one reactive hydrogen atom and are exemplified by amino, hydroxy, and thiol groups. It may be noted that the reaction of a functional group with another group often generates still other groups which are capable of reacting with functional groups. For example, the reaction of an epoxy group with an amino group results in the formation of a β-hydroxyamino group.

Thus, the term "functionalized cationic polymer" is meant to include any polymer which contains a plurality of positively charged groups and a plurality of other functional groups which are capable of being crosslinked by the application of heat. Particularly useful examples of such polymers are epichlorohydrin-functionalized polyamines and epichlorohydrin-functionalized polyamido-amines. Both types of polymers are exemplified by the Kymene® resins which are available from Hercules Inc., Wilmington, Del. Other suitable materials include cationically modified starches, such as such as RediBond, from National Starch.

As used herein, the term "thermally crosslinked" means the coating of the functionalized cationic polymer has been heated at a temperature and for a time sufficient to crosslink the above-noted functional groups. Heating temperatures typically may vary from about 50° C. to about 150° C. Heating times in general are a function of temperature and the type of functional groups present in the cationic polymer. For example, heating times may vary from less than a minute to about 60 minutes or more.

Second Embodiment

As another example, the second element may include a fibrous filter which includes hydrophobic polymer fibers, amphiphilic macromolecules adsorbed onto at least a portion of the surfaces of the hydrophobic polymer fibers, and a crosslinkable, functionalized cationic polymer associated with at least a portion of the amphiphilic macromolecules, in which the functionalized cationic polymer has been crosslinked. Crosslinking may be achieved through the use of a chemical crosslinking agent or by the application of heat. Desirably, thermal crosslinking, i.e., the application of heat, will be employed. In general, the amphiphilic macromolecules may be of one or more of the following types: proteins, poly(vinyl alcohol), monosaccharides, disaccharides, polysaccharides, polyhydroxy compounds, polyamines, polylactones, and the like. Desirably, the amphiphilic macromolecules will be amphiphilic protein macromolecules, such as globular protein or random coil protein macromolecules. For example, the amphiphilic protein macromolecules may be milk protein macromolecules. The functionalized cationic polymer typically may be any polymer which contains a plurality of positively charged groups and a plurality of other functional groups which are capable of being crosslinked by, for example, chemical crosslinking agents or the application of heat. Particularly useful examples of such polymers are epichlorohydrin-functionalized polyamines and epichlorohydrin-functionalized polyamido-amines. Other suitable materials include cationically modified starches.

The above-noted fibrous filter may be prepared by a method which involves providing a fibrous filter which includes hydrophobic polymer fibers, passing a solution containing amphiphilic macromolecules through the fibrous filter under shear stress conditions so that at least a portion of the amphiphilic macromolecules are adsorbed onto at least some of the hydrophobic polymer fibers to give an amphiphilic macromolecule-coated fibrous web, passing a solution of a crosslinkable, functionalized cationic polymer through the amphiphilic macromolecule-coated fibrous web under conditions sufficient to incorporate the functionalized cationic polymer onto at least a portion of the amphiphilic macromolecules to give a functionalized cationic polymer-coated fibrous web in which the functionalized cationic polymer is associated with at least a portion of the amphiphilic macromolecules, and treating the resulting coated fibrous filter with a chemical crosslinking agent or heat. Desirably, the coated fibrous filter will be treated with heat at a temperature and for a time sufficient to crosslink the functionalized cationic polymer.

Third Embodiment

As still another example, the second element may include a fibrous filter which includes hydrophobic polymer fibers having a cationically charged coating thereon. The coating includes a functionalized cationic polymer which has been crosslinked by heat. The functionalized cationic polymer is an epichlorohydrin-functionalized polyamine or an epichlorohydrin-functionalized polyamido-amine. The fibrous filter may be prepared by a method which involves providing a fibrous filter comprised of hydrophobic polymer fibers; treating the fibrous filter with an aqueous solution of a functionalized cationic polymer crosslinkable by heat under conditions sufficient to substantially coat the fibers with the functionalized cationic polymer, wherein the solution comprises the functionalized cationic polymer, a poly (vinyl alcohol), a polar solvent for the poly(vinyl alcohol), and water; and treating the resulting coated fibrous filter with heat at a temperature and for a time sufficient to crosslink the functionalized cationic polymer present on the hydrophobic polymer fibers. By way of example, the functionalized cationic polymer may be an epichlorohydrin-functionalized polyamine or an epichlorohydrin-functionalized polyamido-amine.

Fourth Embodiment

As yet another example, a fourth element may be included consisting of a packed bed of particles. In certain embodiments, this packed bed may utilize diatomaceous earth particles that are coated with the functionalized cationic polymer described above.

In addition to the foregoing four embodiments, other charge-modified filter materials are known and may be used as the second element, as noted earlier.

Further Embodiments of the Invention

The present invention also provides an integrated filter for removing impurities from a fluid stream. The filter includes a first element adapted to remove at least some of the impurities by physical adsorption, and a second element adapted to remove at least some of the impurities by electrokinetic adsorption. The first element is composed of a porous block of an adsorbent, wherein the block is permeable to fluids and has interconnected pores therethrough, and the second element is composed of a porous, charge-modified fibrous web as defined above. Again, either or both of the first element and the second element further is adapted to remove at least some of the impurities by sieving.

The present invention further provides an integrated filter for removing impurities from a fluid stream. In this case, the filter includes a first element adapted to remove at least some of the impurities by electrokinetic adsorption, a second element adjacent to and contiguous with the first element and adapted to remove at least some of the impurities by physical adsorption, and a third element adjacent to and contiguous with the second element and adapted to remove at least some of the impurities by electrokinetic adsorption. By way of example, each element may be in the form of a sheet.

One embodiment of the integrated filter of the present invention is shown in FIG. 1. In FIG. 1, the integrated filter 10 consists of a first element 11 and a second element 12. The first element 11 is a solid cylindrical extruded activated carbon block. The second element 12 is a charge-modified nonwoven web wrapped around the first element 11. The elements 11 and 12 are concentric and continuous; the outer surface 13 of the first element 11 is contiguous with the inner surface 14 of the second element 12. To use the integrated filter 10, a fluid, such as water or air, may enter the integrated filter 10 at the outer surface 15 of the second element 12, as indicated by arrows 16. The fluid may flow through the second element 12 into the first element 11 and exit from an end 17 of the first element 11, as indicated by arrow 18. If desired, the second element 12 may consist of a single layer as shown, or a plurality of layers which may be the same or different.

Figure 2:
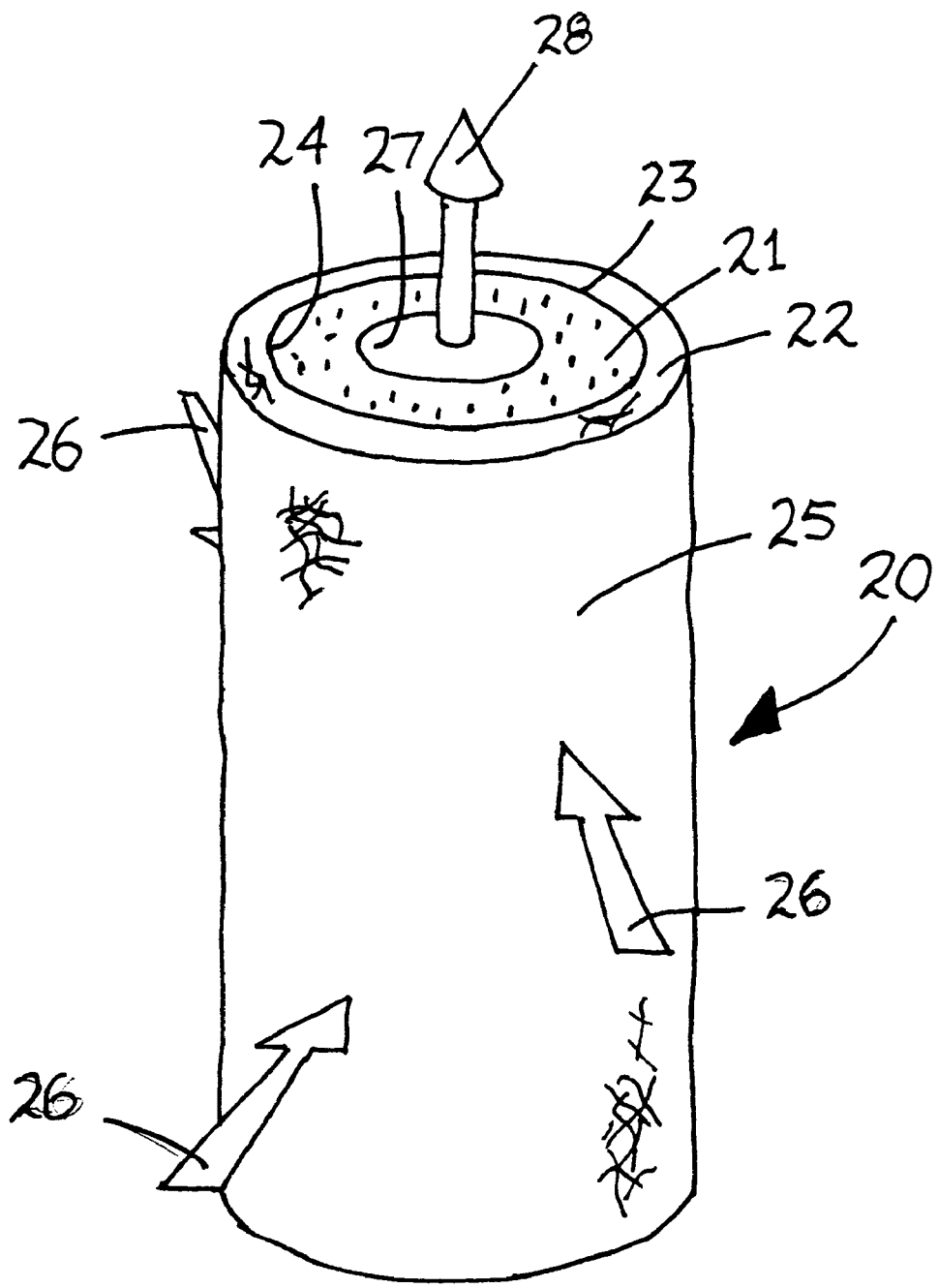
FIG. 2 is a diagrammatic representation of another embodiment of the present invention.

A variation of the integrated filter 10 of FIG. 1 is illustrated by FIG. 2. In FIG. 2, the integrated filter 20 consists of a first element 21 and a second element 22. The first element 21 is a hollow cylindrical extruded activated carbon block. The second element 22 is a charge-modified nonwoven web wrapped around the first element 21. The elements 21 and 22 are concentric and continuous; the outer surface 23 of the first element 21 is contiguous with the inner surface 24 of the second element 22. To use the integrated filter 20, a fluid, such as water or air, may enter the integrated filter 20 at the outer surface 25 of the second element 22, as indicated by arrows 26. The fluid will flow through the second element 22 into the first element 21 and exit from the inner surface 27 of the first element 21, as indicated by arrow 28.

Figure 3:
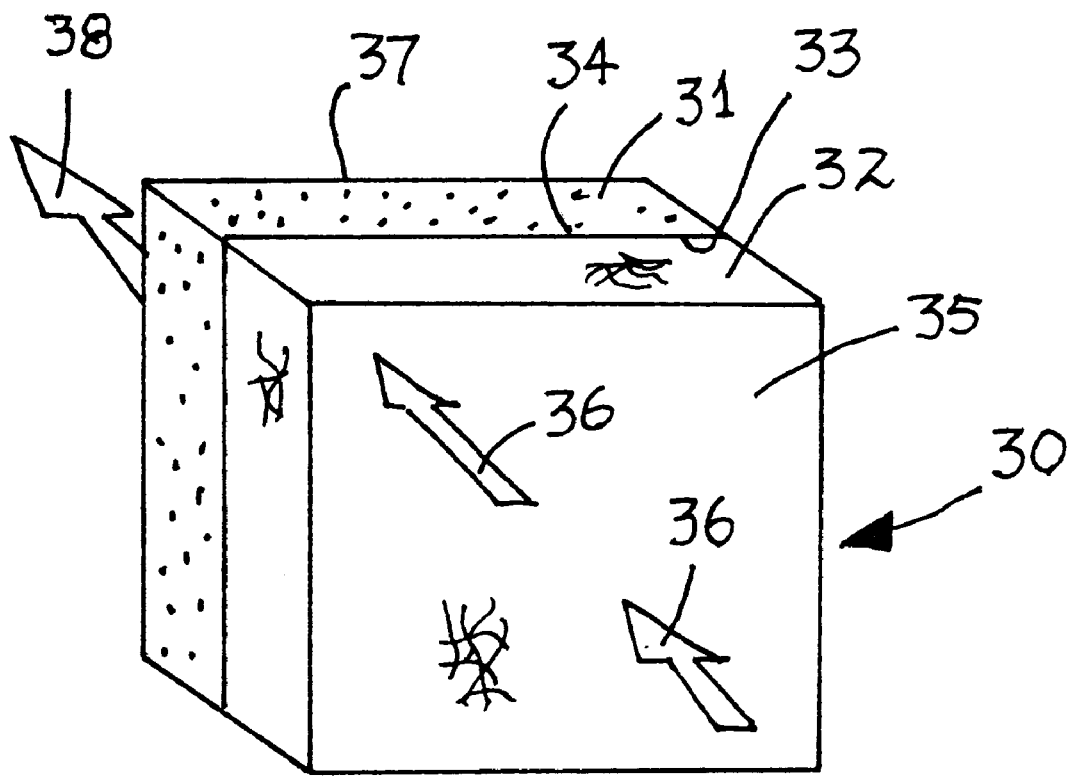
FIG. 3 is a diagrammatic representation of another embodiment of the present invention.

Alternatively, the elements shown in FIGS. 1 and 2 may take the form of flat sheets, rather than cylinders, as shown in FIG. 3. In FIG. 3, the integrated filter 30 consists of a first element 31 and a second element 32. The first element 31 is an extruded activated carbon block in the form of a sheet. The second element 32 is a charge-modified nonwoven web adjacent to and contiguous with the first element 31. Thus, the outer surface 33 of the first element 31 is contiguous with the inner surface 34 of the second element 32. To use the integrated filter 30, a fluid, such as water or air, may enter the integrated filter 30 at the outer surface 35 of the second element 32, as indicated by arrows 36. The fluid will flow through the second element 32 into the first element 31 and exit from the outer surface 37 of the first element 31, as indicated by arrow 38.

Figure 4:
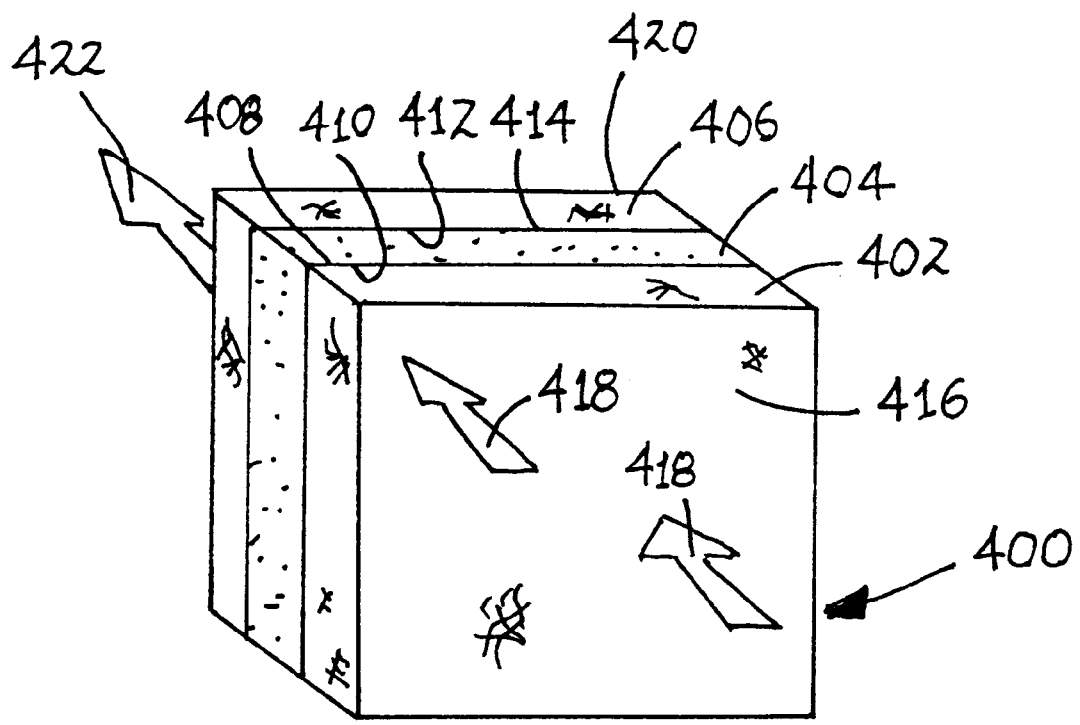
FIG. 4 is a diagrammatic representation of another embodiment of the present invention.

If desired, a third element may be added to the integrated filter 30 of FIG. 3, as shown in FIG. 4. In FIG. 4, the integrated filter 400 consists of a first element 402, a second element 404, and a third element 406. The first element 402 is a charge-modified nonwoven web, the second element 404 is an extruded activated carbon block in the form of a sheet, and the third element 406 is a charge-modified nonwoven web. The second element 404 is adjacent to and contiguous with the first element 402 and the third element 406 is adjacent to and contiguous with the second element 404. Thus, the inner surface 408 of the first element 402 is contiguous with one inner surface 410 of the second element 404 and the inner surface 412 of the third element 406 is contiguous with the other inner surface 414 of the second element 404. In use, a fluid, such as water or air, may enter, for example, the integrated filter 400 at the outer surface 416 of the first element 402, as indicated by arrows 418. The fluid will flow through the first element 402 and then successively through the second element 404 and the third element 406, exiting from the outer surface 420 of the third element 406, as indicated by arrow 422.

The first and third elements may be the same or different. If the latter, the differences may relate to the type of web, the type of charge modification, or both. For example, one element may be based on a spunbonded nonwoven web and the other element may be based on a meltblown nonwoven web. Moreover, either or both of the elements may consist of two or more layers. By way of illustration, either or both layers may be spunbonded-meltblown or spunbonded-meltblown-spunbonded laminates as described in U.S. Pat. No. 4,041,203 to Brock et al., commonly referred to as SM and SMS webs or fabrics, respectively; such patent is incorporated herein by reference in its entirety.

While the specification has been described in detail with respect to specific embodiments thereof, it will be appreciated that those skilled in the art, upon attaining an understanding of the foregoing, may readily conceive of alterations to, variations of, and equivalents to these embodiments. For example, the integrated filter shown in FIGS. 3 and 4 may be composed of elements which are not in sheet form. For example, the elements may be cylindrical, rectangular, or any other shape. In addition, a solid activated carbon block element, such as those depicted in FIGS. 1–4, may be replaced with a packed bed of granular activated carbon. Furthermore, a plurality of both types of elements may be employed, either serially or in parallel.

EXAMPLES

The present invention may be understood by reference to the following Examples, without being limited thereto.

In the following Examples, an aqueous solution (22 L) containing 0.4 percent by weight of an epichlorohydrin-functionalized polyamine (Kymene® 2064, Hercules Inc., Wilmington Delaware) was prepared. This particular Kymene has no hydrolyzable functional groups but is high in charge-density. Kymene avoids possible hydrolysis and ensures the effectiveness of charge-modified media during its water encountering life-time. The pH of the solution was about 6 and was used without further adjusting.

A microfiber glass filter (LB-5211-A-O, from Hollingsworth & Vose Company, East Walpole, Mass., containing 3–7% acrylic resin binder and a 0.5 osy or about 17 gsm Reemay supporting scrim). The web was passed through the aforesaid solution at a rate of 5 ft/min, a nip, and then a vacuum to remove any excess Kymene solution. The coated web was finally passed through a through an air drier to crosslink the Kymene. The web was heated at 195° F. for 1 minute. The crosslinked web was then washed in line with water jets to remove any uncrosslinked Kymene and then dried again at the same temperature (195° F.) for 1 minute.

The coated web was then arranged in a spirally-wound, two-layer configuration with a PLEKX™ filter media (available from KX Industries) as described above. The PLEKX™ filter media was the outer layer and the above-described coated filter media comprised the inner layer in the spiral configuration. The spirally-wound, two-layer filter was then tested for bacteria capture according to the United States Environmental Protection Agency's April 1986 Guide Standard and Protocol for Testing Microbiological Water Purifiers.

Bacteria-containing effluent was passed perpendicular to the surface of the filter toward the filter center and then allowed to exit at the bottom of the filter. The filtered effluent was then collected at specified sampling points as indicated in the table below. In addition, various stagnation periods were employed as indicated below that allowed the effluent to "sit" in the filter for a period of time before being tested according to the above-referenced Protocol. The following results were obtained with "Influent CFU/ml" indicated the amount of pathogens present in the replenished stock solution prior to filtering. The "Log Capture" indicates the amount of pathogen reduction at the noted sampling points.

The table below and graph illustrate the data showing the effective pathogen capture of the invention described herein.

| Sample | Influent CFU/mL | Log Capture |
| --- | --- | --- |
| Initial | 5.50E+06 | 4.48 |
| 25 gallon | 6.80E+05 | 3.58 |
| 50 gallon | 8.40E+05 | 3.81 |
| After 48 hr Stagnation | 8.30E+05 | 2.66 |
| 60 gallon | 1.30E+06 | 2.94 |
| 75 gallon | 1.00E+06 | 2.60 |
| After 48 hr Stagnation | 1.20E+06 | 2.62 |
| 100 gallon | 2.00E+06 | 2.73 |

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. An integrated filter for removing impurities from a fluid stream, the filter comprising:
   a first element adapted to remove at least some of the impurities by physical adsorption; and
   a second element adapted to remove at least some of the impurities by electrokinetic adsorption.

2. The integrated filter of claim 1, in which the first element further is adapted to remove at least some of the impurities by sieving.

3. The integrated filter of claim 1, in which the second element further is adapted to remove at least some of the impurities by sieving.

4. The integrated filter of claim 1, in which the first element is comprised of a porous block of an adsorbent, wherein the block is permeable to fluids and has interconnected pores therethrough.

5. The integrated filter of claim 4, in which the first element further is comprised of a granular adsorbent component and a thermoplastic binder component.

6. The integrated filter of claim 4, in which the adsorbent is activated carbon, activated alumina, activated bauxite, fuller's earth, diatomaceous earth, silica gel, or calcium sulfate.

7. The integrated filter of claim 1, in which the second element is comprised of a porous, charge-modified fibrous web comprising fibers prepared from a thermoplastic polymer.

8. The integrated filter of claim 7, in which the thermoplastic polymer is a polyolefin.

9. The integrated filter of claim 8, in which the porous, charge-modified fibrous web is a meltblown web.

10. The integrated filter of claim 9, in which said meltblown web is coated with a functionalized cationic polymer.

11. The integrated filter of claim 1, in which the second element is comprised of a packed bed of particles.

12. The integrated filter of claim 11, in which said particles are coated with a functionalized cationic polymer.

13. The integrated filter of claim 1, in which the second element is comprised of a microfiber glass web.

14. The integrated filter of claim 13, in which said microfiber glass web is coated with a functionalized cationic polymer.

15. The integrated filter of claim 1, in which the first element is comprised of a
   coextruded block composite comprising:
      a porous first block which
         is permeable to fluids;
         is comprised of a granular adsorbent component and a thermoplastic binder component; and
         has interconnected pores therethrough having a first average diameter; and
      a second block;
   in which
      at least one of the first block and the second block is continuous; and
      at least a portion of the second block is contiguous with at least a portion of the first block.

16. An integrated filter for removing impurities from a fluid stream, the filter comprising:
   a first element adapted to remove at least some of the impurities by physical adsorption; and
   a second element adapted to remove at least some of the impurities by electrokinetic adsorption;
   in which
      the first element is comprised of a porous block of an adsorbent, wherein the block is permeable to fluids and has interconnected pores therethrough; and
      the second element is comprised of a porous, charge-modified fibrous web comprising fibers prepared from a thermoplastic polymer.

17. The integrated filter of claim 16, in which the first element further is adapted to remove at least some of the impurities by sieving.

18. The integrated filter of claim 16, in which the second element further is adapted to remove at least some of the impurities by sieving.

19. The integrated filter of claim 16, in which the thermoplastic polymer is a polyolefin.

20. The integrated filter of claim 16, in which the porous, charge-modified fibrous web is a meltblown web.

21. The integrated filter of claim 16, in which the porous, charge-modified fibrous web is a microfiber glass web.

22. The integrated filter of claim 16, in which the first element further is comprised of a granular adsorbent component and a thermoplastic binder component.

23. The integrated filter of claim 22, in which the adsorbent is activated carbon, activated alumina, activated bauxite, fuller's earth, silica gel, or calcium sulfate.

24. An integrated filter for removing impurities from a fluid stream, the filter comprising:
   a first element adapted to remove at least some of the impurities by electrokinetic adsorption
   a second element adjacent to and contiguous with the first element and adapted to remove at least some of the impurities by physical adsorption; and
   a third element adjacent to and contiguous with the second element and adapted to remove at least some of the impurities by electrokinetic adsorption.

25. The integrated filter of claim 24, in which each element is a sheet.

* * * * *